United States Patent [19]

Schmitt

[11] Patent Number: 4,593,797
[45] Date of Patent: Jun. 10, 1986

[54] COMPRESSION TYPE RAILROAD BRAKE SLACK ADJUSTER

[75] Inventor: Eugene W. Schmitt, Lockport, Ill.

[73] Assignee: Sloan Valve Company, Franklin Park, Ill.

[21] Appl. No.: 631,454

[22] Filed: Jul. 16, 1984

[51] Int. Cl.$^4$ ............................................. F16D 65/66
[52] U.S. Cl. .............................. 188/196 D; 188/202
[58] Field of Search .............. 188/202, 196 R, 196 D, 188/196 V, 199, 197, 198; 192/111 A

[56] References Cited

U.S. PATENT DOCUMENTS 3,404,759  10/1968  Natschke et al. ................ 188/202
3,406,794  10/1968  Mersereau ....................... 188/202

Primary Examiner—Bruce H. Stoner, Jr.
Assistant Examiner—Robert J. Oberleitner
Attorney, Agent, or Firm—Kinzer, Plyer, Dorn & McEachran

[57] ABSTRACT

A railroad slack adjuster has a threaded adjusting screw, one end of which is adapted to be connected to one portion of a railroad car brake rigging. The slack adjuster also has a clutch housing assembly, telescopic with the adjusting screw and adapted to be connected to another portion of the brake rigging. A clutch disk is rotatably mounted on the adjusting screw for engagement with opposing clutch surfaces within the clutch housing. A trigger housing is telescopically positioned about the adjusting screw, clutch housing and clutch disk. A spring is positioned about the adjusting screw and effective between the clutch housing and adjusting screw to urge the screw outwardly of the clutch housing. There is a further trigger spring positioned about the clutch housing and urging the clutch housing outwardly of the trigger housing. A brake application applied at opposite ends of the slack adjuster to the adjusting screw and clutch housing causes the clutch disk to move between the opposing clutch surfaces as the slack adjuster lets out and takes up slack in the brake rigging during application and release of the brakes.

7 Claims, 4 Drawing Figures

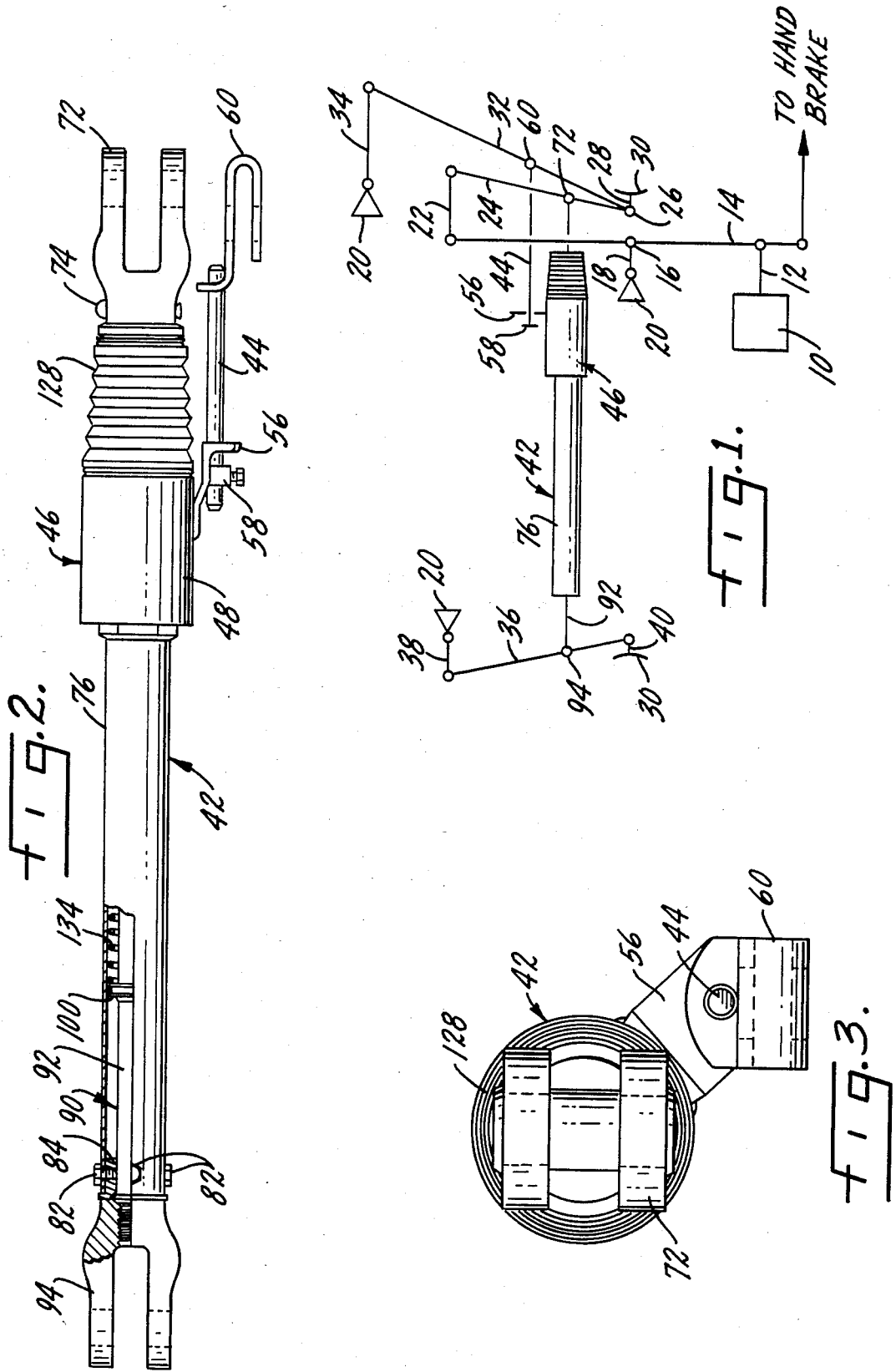

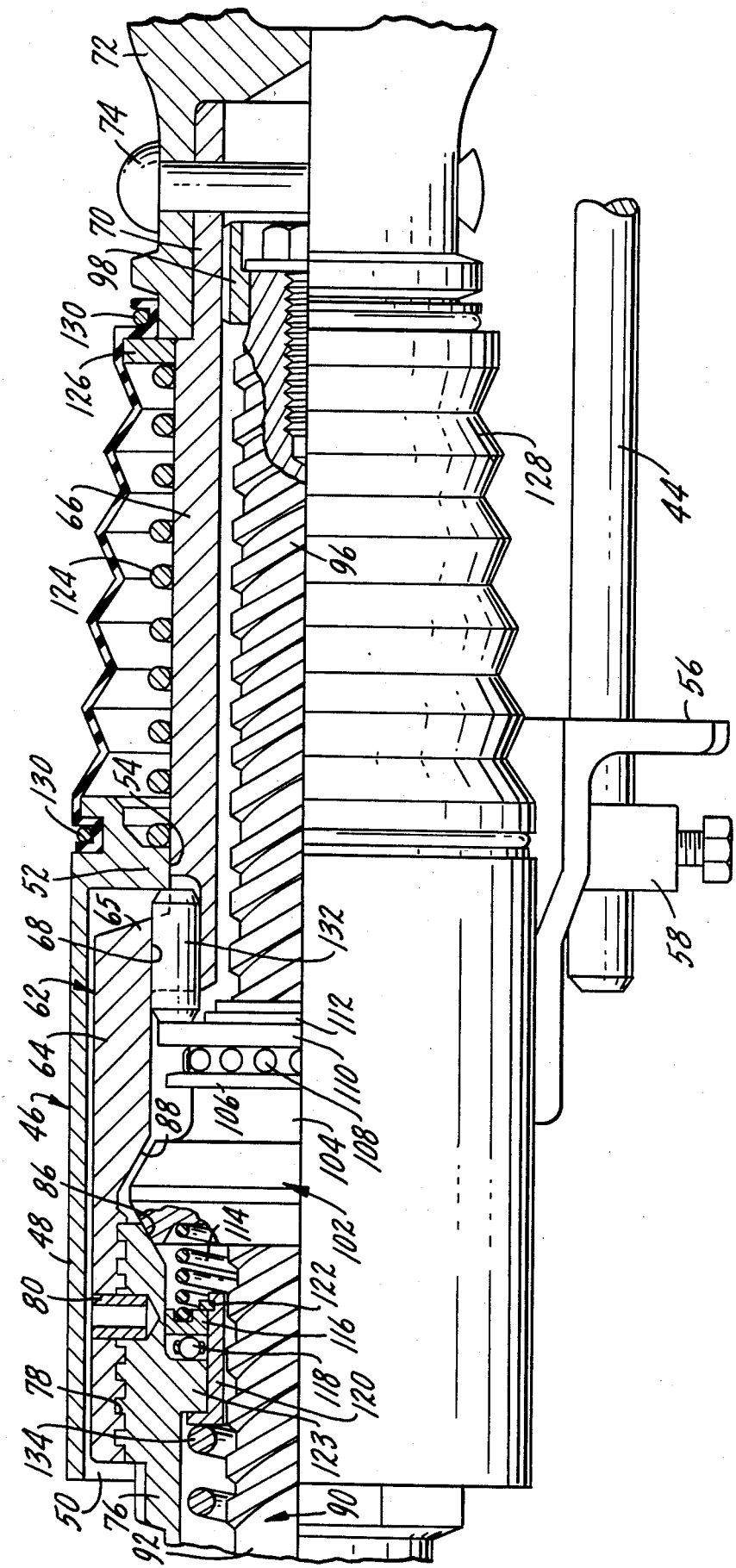

ial tape sheet end at 4,593,797

COMPRESSION TYPE RAILROAD BRAKE SLACK ADJUSTER

SUMMARY OF THE INVENTION

The present invention relates to slack adjusters of the type used in railroad freight cars and has particular application to a railroad freight car slack adjuster having a simplified construction and which operates in compression.

A primary purpose of the invention is a slack adjuster for the described environment having a reduced number of parts and simplified operation to reliably take up and let out slack during use of the brakes.

Another purpose is a slack adjuster of the type described including a threaded adjusting screw and a coaxially arranged clutch housing mounted to opposed portions of the car brake rigging with the tube having opposing clutch surfaces designed to contact a clutch disk rotatably mounted on the telescopic adjusting screw.

Another purpose is a slack adjuster of the type described which during brake application first lets out slack, prior to the time that the slack adjuster is locked into a fixed length, and then takes up slack upon release of the brake application compression.

Other purposes will appear in the following specification, drawings and claims.

BRIEF DESCRIPTION OF THE DRAWINGS

FIG. 1 is a diagrammatic illustration of a portion of railroad freight car brake rigging, illustrating the slack adjuster disclosed herein.

FIG. 2 is a side view of the slack adjuster of the present invention, with portions cut away.

FIG. 3 is an end view of the right side of FIG. 2 on an enlarged scale.

FIG. 4 is a further enlarged partial axial section of the slack adjuster of FIG. 2.

DETAILED DESCRIPTION OF THE INVENTION

Prior patents of the assignee of the present application relating to railroad brake slack adjusters are as follows: U.S. Pat. Nos. 3,249,183, 3,326,334, 3,326,335, 3,454,140, 3,595,347, 3,602,343, and 3,669,224. Also application Ser. No. 579,260, filed Feb. 13, 1984 and assigned to the present assignee, relates to tension type slack adjusters.

The railroad freight car brake rigging illustrated diagrammatically in FIG. 1 includes a brake cylinder 10 having a push rod 12 pivotally connected to a horizontal cylinder lever 14. The cylinder lever 14 is pivoted at 16 to a bar 18 which itself is pivotally connected to the bolster, which is diagrammatically indicated at 20. The end of the cylinder lever 14 is connected by clevises 22 to a live truck lever 24. The opposite end of the live lever is pinned at 26 to a brake beam 28. The brake beam carries brake shoes 30. The brake beam 28 is conventionally hung on the truck side frames (not shown). A control lever 32 is also pinned at 26 to the live truck lever 24 and brake beam 28. The control lever 32 extends to a pivotal connection with a link 34 which is pinned to the bolster 20.

The brake rigging further includes a dead truck lever 36 which is pivotally connected to the bolster 20 through a link 38. At the other end of the dead lever 36 is a second brake beam 40 which carries shoes 30. The slack adjuster of the present invention is shown generally at 42. It is pivotally connected at one end to the live lever 24 and at the other end to the dead lever 36. An actuator rod 44 is pinned at one end to the control lever 32 and slidable at the other end in a bracket 56.

Details of the slack adjuster 42 are shown in FIGS. 2–4. The slack adjuster has a trigger housing 46 made up of a tubular shell 48. The shell has an open left end 50 and an inwardly extending right end piece 52. The end piece has a hexagonally shaped opening at 54. The exterior of the trigger housing 46 carries a bracket 56. The bracket has an opening through which the actuator rod 44 extends. The actuator rod 44 is slidable in the bracket opening to the extent permitted by a stop collar 58 which is fixed to the actuator rod. FIGS. 2 and 3 also illustrate a U-shaped attachment element 60 which is fastened to the end of the actuator rod 44 and provides a connecting point to the control lever 32.

A clutch housing assembly 62 is telescopically arranged within the trigger housing 46. The clutch housing comprises several elements rigidly connected to one another. The clutch housing 62 includes a body member 64 integrally connected by a neck 65 to a hexagonally shaped extension portion 66. The neck 65 has a plurality of circumferentially located openings 68. The left end of the extension 66 engages the hexagonal opening 54 of the trigger housing. The right end 70 of the extension portion 66 has a circular cross section, carrying a jaw or clevis 72 which is fixed to the right end 70 by a rivet 74. The jaw is pivotally connected to the live truck lever. Another element of the clutch housing is an elongated tube 76 attached to the body member 64 by threads 78 and a pin 80. The tube 76 extends outwardly from the trigger housing 46. A lock washer and cap screw 82 retain a bearing member 84 at the far left end of the tube 76 (see FIG. 2).

A pair of opposed clutch surfaces are formed on the interior of the clutch housing. A first clutch surface 86 is formed on the end of the tube 76. A second clutch surface 88 is formed in about the middle of the clutch body 64.

An adjusting screw assembly, shown generally at 90, fits telescopically inside the clutch housing 62. The adjusting screw assembly includes a rod 92 having a jaw 94 affixed to its left end (FIG. 2). The rod extends through the tube 76, the clutch housing body member 64 and the extension 66. In the vicinity of the body member and extension there are threads 96 formed on the rod. The right end of the rod carries an adjusting screw stop 98 which slidably engages the inside diameter of the extension 66. A collar 100 is affixed to the rod inside the tube 76. It may include a seal engaging the interior of the tube.

A clutch disk 102 is rotatably mounted on the adjusting screw threads 96. The clutch disk is disposed between the first and second clutch surfaces 86 and 88. The right side of the disk has a boss 104 contacting a thrust washer 106 which in turn engages a thrust bearing 108. A second thrust washer 110 is held in position by a retaining ring 112. The left side of the clutch disk 102 has a cut out portion which receives a lockup spring 114. The spring rests against a spring seat 116 which engages a thrust bearing 118. A bushing 120 carries a retaining ring 122 to hold the spring seat and thrust bearing against a lip 123 formed on the tube 76.

A trigger spring 124 is disposed between a spring washer 126 and the end face 52 of the trigger housing 46. The spring washer 126 fits on the end of the hexagonal extension portion 66 of the clutch housing. The washer abuts the jaw 72. The trigger spring is supported on the peaks of the hexagonal extension 66. A flexible spring cover 128 is held in place by retaining rings 130. In this position the trigger spring is effective to urge the clutch housing 62 outwardly of the trigger housing 46. Also, the end face 52 of the trigger housing is engageable with a plurality of clutch pins 132 which are slidably positioned in the neck openings 68. The clutch pins engage the thrust washer 110 and, through the thrust bearing 108, washer 106 and boss 104, the pins urge the clutch disk 102 to the left.

A main spring 134 is located between the collar 100 and bushing 120. In this position the spring is effective to urge the adjusting screw assembly 90 outwardly of the clutch housing 62.

For convenience of illustration the slack adjuster is shown in FIGS. 2–4 in the fully collapsed or minimum length position. This approximates the condition the slack adjuster would be in after new shoes were installed on the brake beams. It can be seen from FIG. 1 that with the rigging arranged as shown, the slack adjuster has to become shorter to pull the truck levers 24 and 36 away from the wheels in order to accommodate new brake shoes. This is the opposite from the conventional tension slack adjuster which has to be lengthened in order to accommodate new shoes. Conversely, the compression slack adjuster 42 of this invention has to lengthen in order to compensate for wear. In other words, the slack adjuster lengthens to push the truck levers towards the wheels, thereby compensating for the otherwise enlarged gap created by wear on the shoes. So the slack adjuster "lets out" slack by shortening, as when new shoes are installed. And it "takes up" slack by lengthening, as when the shoes wear.

During a normal application of the brakes (i.e., not with new shoes), the following sequence of events occurs. The brake cylinder 10 extends the piston 12, causing the horizontal cylinder lever 14 to pivot counterclockwise about point 16. Lever 14, acting through clevises 22, pulls the top of the truck live lever 24 to the left. Depending on the friction in the brake rigging and the position of the rigging upon commencement of the brake application, one of the following occurs. The live truck lever 24 may pivot about pin 26, moving the slack adjuster 42 to the left and pushing the dead truck lever 36 toward the wheel. Once the dead lever contacts the wheel the live lever will then pivot about the jaw 72, causing the brake beam 28 to move to the right and apply the brake shoes to the right wheel set. Another possibility is that when the live lever 24 starts to move the slack adjuster remains stationary and the live lever pivots first about point 72, moving brake beam 28 and pushing shoes 30 into engagement with the wheels. At that time the lever 24 will pivot about the point 26, pushing the dead truck lever and its associated brake beam into engagement with the wheels on the left. It's also possible that a combination of these two situations could occur. In any event, the live truck lever eventually causes both brake beams to engage the shoes against the wheels. It will be noted that as the brake beam 28 moves to the right, it carries the control rod 44 to the right while the live truck lever 24 is moving to the left. Thus, there is a relative separation between the live lever 24 and control lever 32. This comes about either by motion of the truck lever and slack adjuster to the left while the brake beam 28 and control lever 32 are stationary, or by motion of the brake beam 28 and control lever 32 to the right while the slack adjuster is stationary. Or it could be a combination of the two. In any case, while the rigging is being locked up against the wheels the angle between the live lever and control lever increases which closes the gap between the stop member 58 and the bracket 56.

Once the rigging is entirely closed up against the wheels, continued pressure exerted by the live truck lever tends to compress the main spring 134 because at this time the adjusting screw assembly 90 is locked against the dead lever 36. The clutch housing 62 moves to the left as it compresses the main spring. This in turn causes the trigger housing 46 to move to the left under the urging of the trigger spring 124. Thus, the trigger housing carries the bracket 56 up against the stop 58. The stop 58 and rod 44 cannot move because the control lever 32 is connected to the brake beam 28 which at this time is stationary, i.e, it is closed up against the wheels. Thus, the bracket 56 and stop 58 limit the leftward movement of the trigger housing. Continued movement of the clutch housing 62 further relieves the pressure of the main spring and the trigger spring on the clutch disk 102 until eventually the lockup spring 114 overcomes the remaining trigger spring pressure on the clutch pins 132 and forces the clutch disk to move to the right where it engages the second clutch surface 88. This happens very rapidly so there is little time for relative motion between the adjusting screw assembly and the clutch housing before the clutch disk engages the second clutch surface. The described movement of the clutch disk then locks up the slack adjuster. That is, the compression on the clutch housing is transferred directly through the clutch disk to the adjusting screw assembly and the dead truck lever. At this point, the slack adjuster length is fixed.

While the shoes are in contact with the wheels naturally they tend to wear. So when the brakes are released, the slack adjuster must lengthen in order to push the truck levers closer to the wheels, thereby compensating for the otherwise increased gap between the wheels and the brake shoes. This lengthening occurs as follows.

The link 22 in the brake rigging is actually a pair of clevises or chain links which can only pull the top of the truck lever to the left; they cannot push it to the right. So release of the counterclockwise pressure on the horizontal lever 14 immediately releases the pressure on the truck levers and the brake shoes. As in the usual case, gravity and normal car vibration remove the shoes from contact with the wheels.

Once the pressure on the live lever is removed the main spring 134 pushes the clutch housing 62 to the right which causes the live lever 24 to move back toward the control lever 32. Also, the trigger spring, acting through the trigger housing and bracket 56 will tend to pull the actuator rod 44 to the left. Thus, the load of the trigger spring is transferred from the stop collar 58 back to the clutch pins 132. The load of the trigger spring on the clutch pins and consequently on the clutch disk 102 will eventually overcome the force to the right due to the lockup spring 114. This moves the clutch disk away from the second clutch surface 88. The clutch disk will then rotate on the adjusting screw rod and since the main spring is urging the rod 92 and clutch housing 62 apart at this time, the slack adjuster will lengthen. The trigger spring eventually overcomes the lockup spring entirely and pushes the clutch disk back into engagement with the first clutch surface 86. When the disk locks up on the clutch surface 86, the slack adjuster length is fixed and the brakes are ready for the next application.

When new brake shoes are applied, the slack adjuster has to shorten in order to provide the necessary slack in the rigging. This occurs as follows. Upon the first application of the brakes after the new shoes are installed the brakes will lock up almost immediately and the live lever will pivot about the pin 26. Since the brake beam 28 hardly moved, if at all, during application of the brakes the control lever 32 is essentially fixed. Continued pressure on the live lever 24 pushes the clutch housing 62 to the left and carries with it the trigger housing 46 and bracket 56. When the bracket contacts the stop collar, the load of the trigger spring on the clutch pins 132 is removed and also the main spring is being compressed, allowing the lockup spring to move the clutch disk away from the first clutch surface. When the clutch disk breaks free from the first clutch surface it is free to rotate on the threaded rod. Since the rod and clutch housing are in compression at this time, the length of the slack adjuster shortens until so much of the trigger spring load has been removed that the lockup spring 114 is able to push the clutch disk 102 all the way to the second clutch surface 88. That fixes the slack adjuster length at a length appropriate for the new shoes. Thus, it can be seen that the slack adjuster adjusts for new shoes at the first application of the brakes after the new shoes are installed. Lengthening of the slack adjuster for wear compensation occurs during release of the brakes after each application.

Whereas the preferred form of the invention has been shown and described, it should be realized that there may be many modifications, substitutions and alterations thereto.

The embodiments of the invention in which an exclusive property or privilege is claimed are described as follows:

1. A compression type slack adjuster for use in a railroad brake, the brake rigging being arranged such that during application of the brakes the slack adjuster is in compression, comprising:
   a clutch housing assembly having first and second opposed clutch surfaces formed therein and a first clevis affixed to one end of the housing, the other end being open;
   an adjusting screw assembly having a threaded end fitting telescopically in the open end of the clutch housing, the other end of the screw assembly having a second clevis affixed thereto;
   a clutch disc rotatably mounted on the adjusting screw threads and disposed between the first and second clutch surfaces;
   a trigger housing surrounding at least a portion of the clutch housing and having a bracket attached thereto;
   a main spring engaging the adjusting screw assembly and the clutch housing assembly, urging the first and second clevises apart;
   a trigger spring bearing against the clutch housing and the trigger housing, urging the trigger housing and clutch housing apart;
   a plurality of clutch pins slidably mounted in the clutch housing assembly and engageable between the trigger housing and clutch disc so as to transmit the trigger spring force to the clutch disc;
   an actuator rod having a stop collar, the rod being connectable to the brake rigging and slidable in the bracket with the bracket between the stop collar and the brake rigging, the stop collar and bracket being engageable upon sufficient relative separation of the rod and trigger housing to compress the trigger spring and remove the trigger spring force from the clutch pins; and
   a lockup spring disposed between the clutch housing and clutch disc to apply a force to the clutch opposite that applied by the trigger spring.

2. The slack adjuster of claim 1 further characterized in that the clutch disk engages thrust bearings on either side of it to permit it to rotate on the adjusting screw.

3. The slack adjustor of claim 1 further characterized in that the clutch housing comprises an elongated tube rigidly connected to a clutch body member.

4. The slack adjuster of claim 3 further characterized in that the first clutch surface is formed on the tube and the second clutch surface is formed on the clutch body member.

5. The slack adjuster of claim 3 further characterized in that the clutch body member includes an extension having a hexagonal outside cross section.

6. The slack adjuster of claim 5 further characterized in that the trigger housing includes a tubular shell having an end piece with a hexagonal opening engaging the clutch body extension so as to prevent rotation of the trigger housing on the clutch housing.

7. The slack adjuster of claim 5 wherein the trigger spring is coaxially positioned about the clutch body extension.

* * * * *